June 3, 1930.    W. T. McCARTHY    1,761,837
FILM FASTENER FOR REELS
Filed Aug. 11, 1927
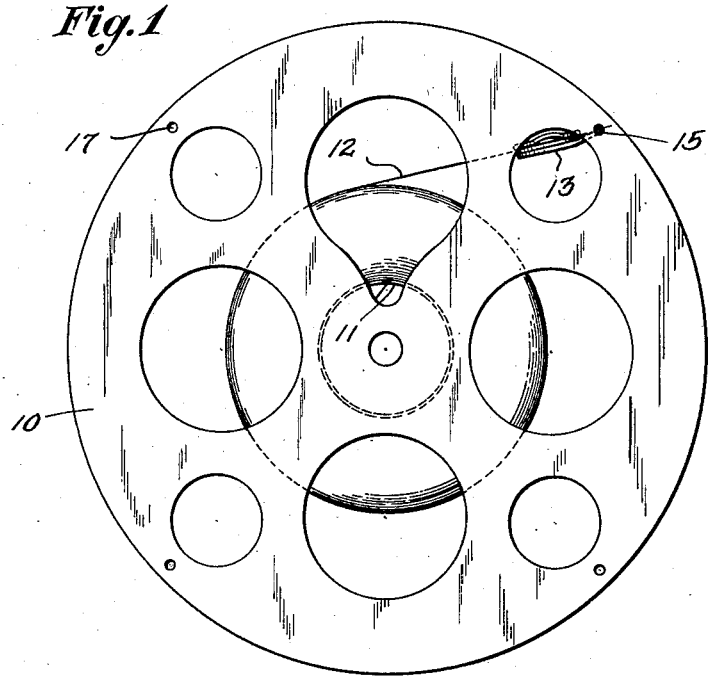
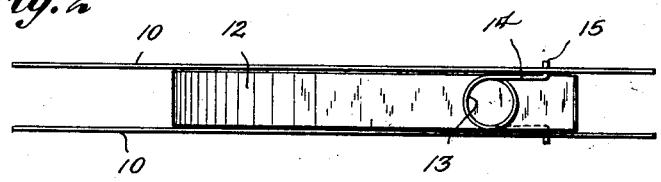
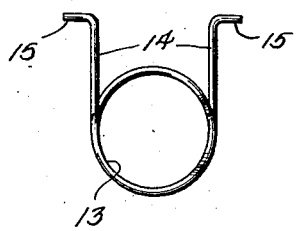
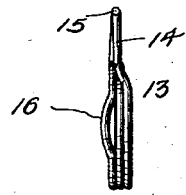
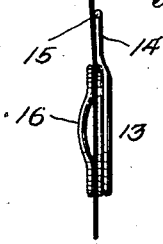

Patented June 3, 1930

1,761,837

UNITED STATES PATENT OFFICE

WILLIAM T. McCARTHY, OF BROOKLYN, NEW YORK

FILM FASTENER FOR REELS

Application filed August 11, 1927. Serial No. 212,171.

This invention relates to photographic appliances and has particular reference to reels for holding motion picture films.

Among the objects of the invention is to provide an attachment to be carried by any usual or conventional reel and so designed as to connect and hold reliably the outer or free end of the film roll, thereby keeping the film in a neat, reliable position and condition, reducing to the minimum all danger or likelihood of marring, breaking, or otherwise damaging the picture.

Another object of the invention is to provide a combination reel and film fastener, the fastener being adapted to be attached easily and readily to or between the side discs or walls of the reel for securing the film and storing it and the reel away or for transportation, and to be as readily disconnected from the film and reel when the picture is to be exhibited.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a moving picture film and reel with a preferred embodiment of my invention applied thereto.

Fig. 2 is a plan or edge view of the devices shown in Fig. 1.

Figs. 3, 4, and 5 are detail views of the film attachment detached from the reel.

Referring now more specifically to the drawings I show a reel comprising side discs or walls 10 and a hub 11 between and around which is fastened and coiled a film 12. The invention contemplates that any conventional or usual reel and film construction may be employed, and my attachment consequently is adapted for application to any such reel for the holding of the otherwise loose end of the film carried thereon or thereby.

Whereas it is customary to employ bits of paper tape or the like for fastening temporarily the loose end of the film, such expedient is not only troublesome in manipulation but is more or less calculated to mar the film and render it pasty or gummed up, necessitating the severance of such portion of the film from time to time.

My improvement therefore consists of a spring or other suitable attachment adapted to be attached readily to the reel, as between the side walls 10 thereof adjacent to their periphery, and adapted to catch, snub, or otherwise temporarily hold the end of the film. This attachment or fastener is illustrated as comprising a coil spring 13 having spaced parallel legs 14 terminating in oppositely directed feet 15. The foot portions of the spring actuated legs may engage or embrace the edge portions of the discs 10 in any manner suitable for easy and quick attachment thereof to the reel or disconnection thereof from the reel. It is to be understood that when the reel and film are in use the attachment 13 is removed, giving the usual clearance for the movement of the film. After the film is rewound upon the reel, the spring fastener is applied to that portion of the reel adjacent to the outer end of the film, and the loose end of the film is slipped in any convenient manner between adjacent coils of the spring and is thereby held in neat, taut condition. To facilitate the slipping of the film between the coils as aforesaid one of them is turned up slightly as at 16 to serve as a guide for admitting the film between the main portions of the coils where it is effectively held. As one convenient means for attaching the fastener to the reel I form a series of pairs of holes 17 through the edge portions of the discs, the holes of each pair being in alinement and parallel to the axis of the reel. Upon the application of pressure against the legs 14 the feet 15 are brought into position to snap outward away from each other into that pair of holes situated most favorably for the end of the film. The resiliency of the fastener insures not only that the film will be reliably held but also that the fastener itself will be sure to remain in place, and will be free to swing around the axis of the feet 15, thereby accommodating itself to the film irrespective of the diameter of the roll. It will be observed also that the film is in no manner marred, broken, or otherwise damaged.

From the nature of the gripping member it will be obvious that the film may be gripped and held at any desired distance from the end thereof. Furthermore the holding action, being frictional, permits the film to be drawn or slipped manually along the fastener if desired.

I claim:

1. The herein described fastener for the end of a film comprising a coil of spring material, and resilient means to attach the fastener detachably to the rim portion of the reel, said resilient means including laterally extending portions to engage the sides of the reel.

2. A fastener for a film wound on a reel, said fastener including means to engage the end of a film, and means including a pair of members to detachably engage the sides of the reel, said means being resilient to actuate said members into engagement with the reel.

3. A fastener for a film wound on a reel, said fastener including a plurality of portions detachably engaging the sides of the reel, said fastener having means to engage the end of the reel, said means having resilient portions to actuate the same into engagement as aforesaid.

4. A fastener for a film wound on a reel, said fastener including a coil between the turns of which an end of the film is received, said coil terminating in end portions that engage the sides of the reel.

5. A fastener for a film wound on a reel, said fastener being made of a wire-like member having means to engage the opposite sides of the reel, said means being interconnected by a loop of the wire, said loop including a plurality of portions between which the film is engaged.

6. In combination, a reel, and a fastener for the end of a film comprising a coil of spring material, and resilient means to attach the fastener detachably to the rim portion of the reel, the means for fastening the fastener to the reel comprising a pair of legs extending along the sides of the reel, said legs having feet extending into lateral holes in the sides of the reel.

7. The herein described fastener for the end of a film comprising a coil of spring material, and resilient means to attach the fastener detachably to the rim portion of the reel, said resilient means including laterally extending portions to engage the sides of the reel, the coil including a plurality of turns one of which is deflected from the other turn to provide a guide-lip for the film.

In testimony whereof I affix my signature.

WILLIAM T. McCARTHY.